(12) United States Patent
Wang et al.

(10) Patent No.: US 11,880,689 B2
(45) Date of Patent: Jan. 23, 2024

(54) SERVER POWER-DOWN DETECTION METHOD AND SYSTEM, DEVICE, AND MEDIUM

(71) Applicant: INSPUR SUZHOU INTELLIGENT TECHNOLOGY CO., LTD., Jiangsu (CN)

(72) Inventors: Haibo Wang, Jiangsu (CN); Zhihua Ge, Jiangsu (CN)

( * ) Notice: Subject to any disclaimer, the term of this patent is extended or adjusted under 35 U.S.C. 154(b) by 0 days.

(21) Appl. No.: 18/021,603

(22) PCT Filed: Jul. 30, 2021

(86) PCT No.: PCT/CN2021/109510
§ 371 (c)(1),
(2) Date: Feb. 16, 2023

(87) PCT Pub. No.: WO2022/078013
PCT Pub. Date: Apr. 21, 2022

(65) Prior Publication Data
US 2023/0229451 A1    Jul. 20, 2023

(30) Foreign Application Priority Data

Oct. 16, 2020   (CN) .......................... 202011108617.7

(51) Int. Cl.
G06F 9/4401 (2018.01)
G06F 1/26 (2006.01)
(Continued)

(52) U.S. Cl.
CPC .............. *G06F 9/4401* (2013.01); *G06F 1/26* (2013.01); *G06F 9/442* (2013.01); *G06F 9/445* (2013.01);
(Continued)

(58) Field of Classification Search
CPC .......... G06F 1/26; G06F 9/4401; G06F 9/445; G06F 9/442; G06F 2221/034; G06F 11/00
(Continued)

(56) References Cited

U.S. PATENT DOCUMENTS 8,549,277 B2 * 10/2013 Tang ................... G06F 11/1433
713/1
2005/0021260 A1 * 1/2005 Robertson .............. G01R 31/30
714/E11.154
(Continued)

FOREIGN PATENT DOCUMENTS

CN          108089964 A     5/2018
CN          109144778 A     1/2019
(Continued)

OTHER PUBLICATIONS

Corresponding International Patent Application No. PCT/CN2021/109510, International Search Report, dated Nov. 2, 2021.
Corresponding International Patent Application No. PCT/CN2021/109510, Written Opinion, dated Nov. 2, 2021.

*Primary Examiner* — Ji H Bae
(74) *Attorney, Agent, or Firm* — Cooper Legal Group LLC

(57) ABSTRACT

A server power-down detection method and system, a device, and a storage medium are disclosed, wherein the method includes: in response to the completion of hardware power on, controlling a PCH to read BIOS codes from BIOS flash storage particles via a first interface and running the BIOS codes; detecting whether bits of a register of the PCH have been set; in response to the bits of the register of the PCH being set, controlling the PCH to send power-down completion information to a BMC via a second interface; and in response to the BMC receiving the power-down completion information, recording the power-down completion information in BMC flash storage particles, and per-
(Continued)

forming the hardware power on again until a test is completed.

20 Claims, 3 Drawing Sheets

(51) Int. Cl.
    *G06F 11/00*     (2006.01)
    *G06F 9/445*     (2018.01)

(52) U.S. Cl.
    CPC ........ *G06F 11/00* (2013.01); *G06F 2221/034* (2013.01)

(58) Field of Classification Search
    USPC .................................. 713/1, 2, 300; 702/119
    See application file for complete search history.

(56) References Cited

U.S. PATENT DOCUMENTS

| | | | |
|---|---|---|---|
| 2012/0084589 A1* | 4/2012 | Millet | G06F 1/3275 |
| | | | 713/323 |
| 2016/0011646 A1 | 1/2016 | Maity et al. | |
| 2023/0115629 A1* | 4/2023 | Balasubramani | G06F 13/4221 |
| | | | 713/310 |

FOREIGN PATENT DOCUMENTS

| | | |
|---|---|---|
| CN | 109491846 A | 3/2019 |
| CN | 109857471 A | 6/2019 |
| CN | 110806794 A | 2/2020 |
| CN | 111722960 A | 9/2020 |
| CN | 112199244 A | 1/2021 |

* cited by examiner

SERVER POWER-DOWN DETECTION METHOD AND SYSTEM, DEVICE, AND MEDIUM

This application claims priority to Chinese Patent Application No. 202011108617.7, filed on Oct. 16, 2020 in China National Intellectual Property Administration and entitled "Server Power-down Detection Method and System, Device, and Medium", which is hereby incorporated by reference in its entirety.

FIELD

The present disclosure relates to the field of servers, in particular to a server power-down detection method and system, computer device, and a readable medium.

BACKGROUND

A general-purpose server is subject to an AC cycle test (alternating current cycle test) in a design stage. The test flow is as follows: AC (alternating current) power on for the server→automatic startup of a system→entry into an OS→execution of a shutdown script under the OS→entry, by the server, into an S5 state (S5 state: alternating current is supplied until power on is completed)→AC power down→a certain interval→AC power on for the server. The next startup and shutdown test is then continued.

The main purpose of the test is to simulate, if alternating current supply to a computer room of a data center is unstable, whether the server can be automatically enabled after discontinuous power off and power on. In the AC test, the function of automatic startup of the system after AC power on is realized by setting an AUTO POWERUP option in a BIOS (Basic Input Output System) into effect. However, if the time interval from AC power down to power on is too short, the power down of a main board is incomplete, and the AUTO POWERUP in the BIOS cannot take effect, whereby the startup cannot be realized. In order to measure whether power is completely down, a traditional detection method is to detect the power state of a PCH (Platform Controller Hub) by using an oscilloscope.

Generally, the startup and shutdown of the general-purpose server are managed and controlled by the PCH on the main board, where the PCH has four power supplies of 3.3 V, 1.8 V, 1.0 V, and 1.05 V. In the power design architecture of the main board of the general-purpose server, a determination is generally made through Power-Good signals of power chips corresponding to the four power supplies. The determination method is unreliable, because the Power-Good signal of a DC-DC (direct current-direct current) module generally has a large error, which is about 8% to 20%. It is inaccurate to record the state of a power supply with this signal, because most chips require 5% or even lower accuracy of power supplies. Based on this, the traditional method to detect whether the PCH is powered down in the AC test is to measure the four power supplies of 3.3 V, 1.8 V, 1.0 V, and 1.05 V by using an oscilloscope. However, in an AC measurement environment, when a machine repeats a startup and shutdown test of power on and power down, an oscilloscope probe is required to contact a test point of a power supply. In such a test method, the construction of a test environment takes a long time and has the risk of causing a short out in circuit board. In the AC measurement environment, when the machine repeats the startup and shutdown test of power on and power down, the electromagnetic field in a chassis changes greatly, which will affect the accuracy of voltage measurement by the oscilloscope.

SUMMARY

In view of this, embodiments of the present disclosure aim to provide a server power-down detection method and system, a computer device, and a computer-readable storage medium, where a BIOS is used to detect whether bits of a register of a PCH have been set, and power-down completion information is sent to a BMC (Baseboard Management Controller), whereby the method is simple and convenient, has strong universality, and does not need any oscilloscope, thereby reducing detection costs.

Based on the above objective, one aspect of the embodiments of the present disclosure provides a server power-down detection method, including the following steps: in response to a completion of hardware power on, controlling a PCH to read BIOS codes from BIOS flash storage particles via a first interface and running the BIOS codes; detecting whether bits of a register of the PCH have been set; in response to the bits of the register of the PCH being set, controlling the PCH to send power-down completion information to a BMC via a second interface; and in response to the BMC receiving the power-down completion information, recording the power-down completion information in the BMC flash storage particles, and performing the hardware power on again until a test is completed.

In some implementations, the method further includes: in response to the completion of hardware power on, reading BMC codes from the BMC flash storage particles and running the BMC codes.

In some implementations, the method further includes: in response to a stop in a test process, checking whether the power-down completion information is present in the BMC.

In some implementations, the method further includes: in response to the absence of the power-down completion information in the BMC, prolonging an interval time for power down.

In some implementations, the step of performing the hardware power on again until the test is completed includes: incrementing a number of tests by one, determining whether the number of tests reaches a first threshold value, and determining, based on a determination result, whether to return to or complete the test.

In some implementations, the step of controlling the PCH to read the BIOS codes from the BIOS flash storage particles via the first interface and running the BIOS codes includes: controlling the PCH to read the BIOS codes from the BIOS flash storage particles via the first interface, and to transmit the BIOS codes to a CPU (Central Processing Unit) via a third interface for running.

In some implementations, the method further includes: giving an alarm in response to a duration in which the bits of the register of the PCH have not been set exceeding a second threshold value.

Another aspect of the embodiments of the present disclosure further provides a server power-down detection system, including: a running module configured for, in response to a completion of hardware power on, controlling a PCH to read BIOS codes from BIOS flash storage particles via a first interface and running the BIOS codes; a detection module configured for detecting whether bits of a register of the PCH have been set; an information module configured for, in response to the bits of the register of the PCH being set, controlling the PCH to send power-down completion information to a BMC via a second interface; and a recording module configured for, in response to the BMC receiving the power-down completion information, recording the power-down completion information in the BMC flash storage particles, and performing the hardware power on again until a test is completed.

Still another aspect of the embodiments of the present disclosure further provides a computer device, including: at least one processor; and a memory storing computer instructions executable on the processor, when the instructions are executed by the processor, the steps of the foregoing method are implemented.

Yet another aspect of the embodiments of the present disclosure further provides a computer-readable storage medium. The computer-readable storage medium stores a computer program implementing the steps of the foregoing method when executed by a processor.

Compared with the prior art, the present disclosure has the following technical effects:

(1) The cost is low, no oscilloscope is required, the hardware test cost is effectively reduced, and the test accuracy is also improved;
(2) The present disclosure is simple and convenient, and does not need to use a traditional oscilloscope to build a test environment; and
(3) The present disclosure has strong universality and may be applied to servers with other architectures. Meanwhile, the design method has huge application value for the future server market.

BRIEF DESCRIPTION OF THE DRAWINGS

In order to describe the technical solutions in the embodiments of the present disclosure or in the prior art more clearly, drawings required to be used in the illustration of the embodiments or the prior art will be briefly introduced below. Apparently, the drawings in the illustration below are only some embodiments of the present application. Those ordinarily skilled in the art also can obtain other drawings according to the provided drawings without creative work.

DETAILED DESCRIPTION

In order to make the objectives, technical solutions and advantages of the present disclosure clearer, the embodiments of the present disclosure will be further described in detail below in conjunction with specific embodiments and the accompanying drawings.

It should be noted that all expressions of "first" and "second" in the embodiments of the present disclosure are used to distinguish two different entities or parameters with the same name. It can be seen that "first" and "second" are only for the convenience of expression, should not be understood as limiting the embodiments of the present disclosure, and will not be explained one by one in subsequent embodiments.

Figure 1:
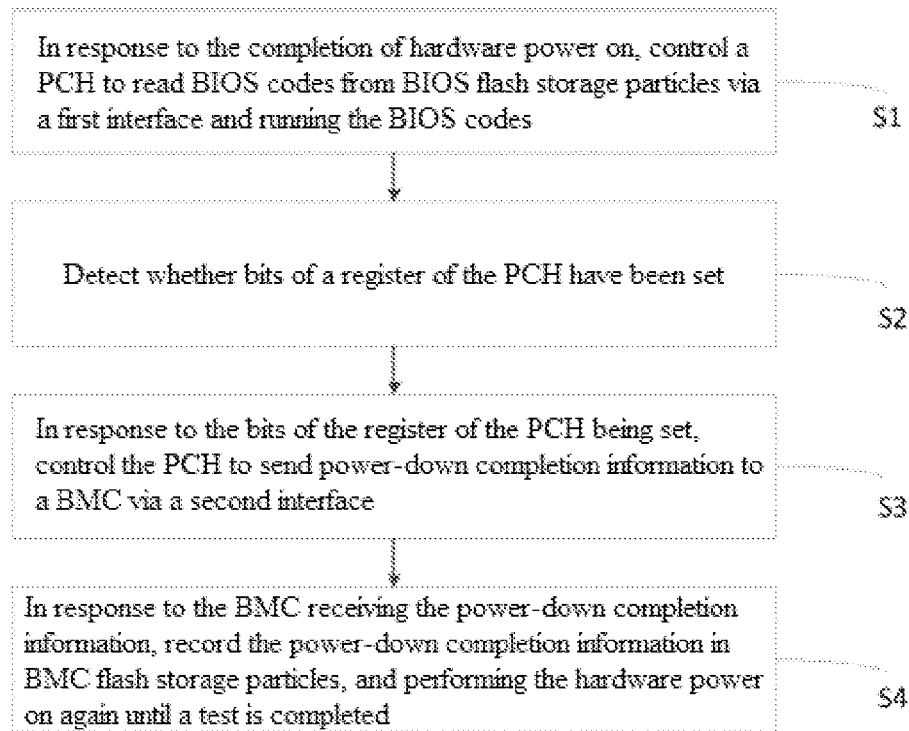
FIG. 1 is a schematic diagram of an embodiment of a server power-down detection method provided by the present disclosure.

Based on the above objective, a first aspect of the embodiments of the present disclosure provides an embodiment of a server power-down detection method. FIG. 1 shows a schematic diagram of an embodiment of a server power-down detection method provided by the present disclosure. As shown in FIG. 1, an embodiment of the present disclosure includes the following steps:

S1, in response to the completion of hardware power on, a PCH is controlled to read BIOS codes from BIOS flash storage particles via a first interface and the BIOS codes are run;

S2, whether bits of a register of the PCH have been set are detected;

S3, in response to the setting of the bits of the register of the PCH, the PCH is controlled to send power-down completion information to a BMC via a second interface; and S4, in response to the BMC receiving the power-down completion information, the power-down completion information is recorded in BMC flash storage particles, and the hardware power on is performed again until a test is completed.

In the embodiment of the present disclosure, the BIOS and the BMC are improved, the BIOS not only realizes conventional functions, but also is added with a function of checking whether the bits of the register of the PCH have been set, and the BMC not only realizes conventional functions, but also is added with a function of recording the received power-down completion information in a form of a log.

Three states mentioned below, i.e., a G3 state, an S5 state and an S0 state, are first introduced. The G3 state represents a state of power supply by a button cell, the S5 state represents a state of power supply by alternating current, and the S0 state represents a state of power on completion. From a time sequence of power on, the server enters the G3 state, the S5 state and the S0 state in turn.

In response to the completion of hardware power on, the PCH is controlled to read the BIOS codes from the BIOS flash storage particles via the first interface and the BIOS codes are run.

In some implementations, the step that a PCH is controlled to read BIOS codes from BIOS flash storage particles via a first interface and the BIOS codes are run includes: the PCH is controlled to read the BIOS codes from the BIOS flash storage particles via the first interface, and to transmit the BIOS codes to a CPU via a third interface for running. The PCH reads the BIOS codes from the BIOS flash storage particles via an SPI interface (the first interface), and transmits the read codes to the CPU via a DMI interface (the third interface) for running.

In some implementations, the method further includes: in response to the completion of hardware power on, BMC codes are read from the BMC flash storage particles and the BMC codes are run.

Whether the bits of the register of the PCH have been set are detected. In response to the setting of the bits of the register of the PCH, the PCH is controlled to send power-down completion information to the BMC via the second interface. The PCH sends the power-down completion information to the BMC via an LPC interface (the second interface).

In response to the BMC receiving the power-down completion information, the power-down completion information is recorded in the BMC flash storage particles, and the hardware power on is performed again until the test is completed. The BMC receives the power-down completion information, and records the power-down completion information in a form of a log in the BMC flash storage particles, and then the next test is performed.

In some implementations, the step that the hardware power on is performed again until a test is completed includes: the number of tests is incremented by one, whether the number of tests reaches a first threshold value is determined, and whether to return to or complete the test is determined based on the determination result.

Figure 2:
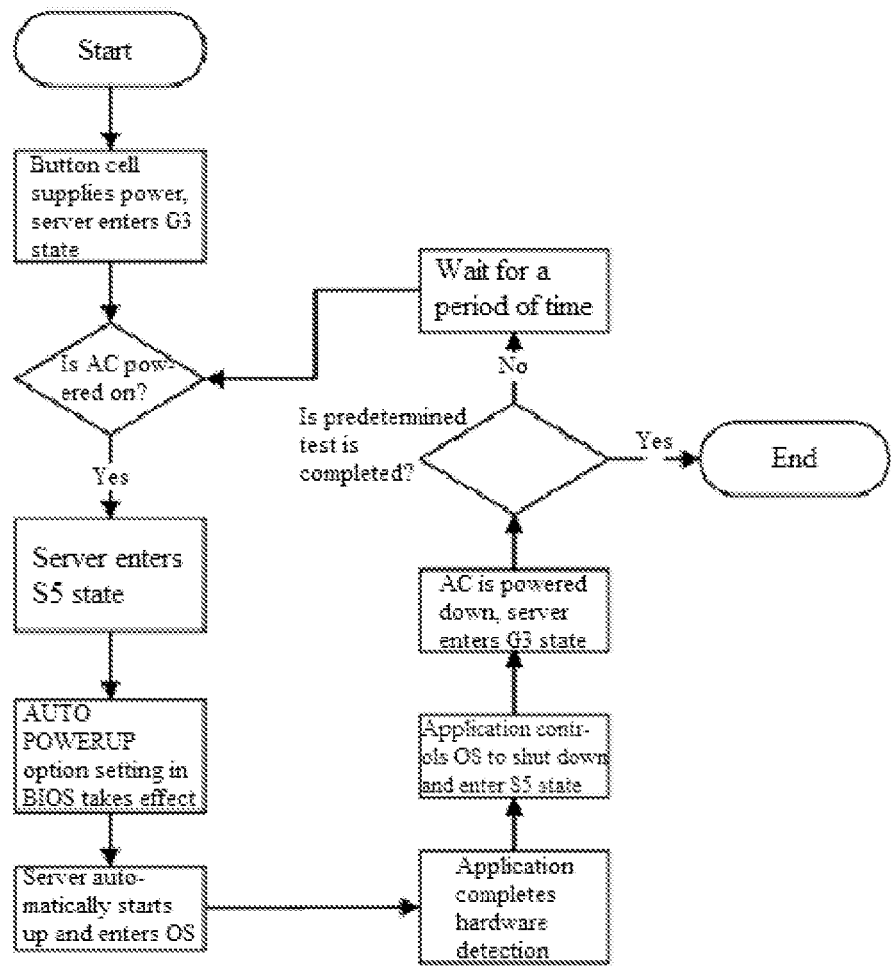
FIG. 2 is a flowchart of an AC cycle test.

FIG. 2 shows a flowchart of an AC cycle test. As shown in FIG. 2, a button cell supplies power, a server enters a G3 state, then whether AC is up is determined, if so, the server enters an S5 state, an AUTO POWERUP option setting in a BIOS takes effect, the server automatically starts up and enters an OS, an application completes hardware detection, and the application controls the OS to shut down and enter the S5 state. Then, the AC is powered down, the server enters the G3 state, whether a predetermined test is completed is determined, that is, whether the number of tests reaches a threshold value is determined, and if not reaching, a period of time is waited for sufficient power down of the server, or if reaching, the test ends.

In some implementations, the method further includes: in response to a stop in a test process, whether the power-down completion information is present in the BMC is checked. In some implementations, the method further includes: in response to the absence of the power-down completion information in the BMC, an interval time for power down is prolonged. When the test is stopped, that is, when the AC cycle test is not continued, the BMC is logged in, and whether a power-down completion log record is present in logs recorded by the BMC is checked. If there is no power-down completion log record, the application needs to be adjusted to increase the power-down time.

In some implementations, the method further includes: an alarm is given in response to a duration in which the bits of the register of the PCH have not been set exceeding a second threshold value. If the bits of the register of the PCH are not set for a long time, it indicates that the power-down process is not completed, and an alarm may be given to remind the tester.

It should be pointed out in particular that each step in each embodiment of the foregoing server power-down detection method may be intersected, replaced, added, or deleted. Therefore, reasonable arrangements, combinations and transformations with regard to the server power-down detection method should also fall into the protection scope of the present disclosure, and the protection scope of the present disclosure should not be limited to the embodiments.

Figure 3:
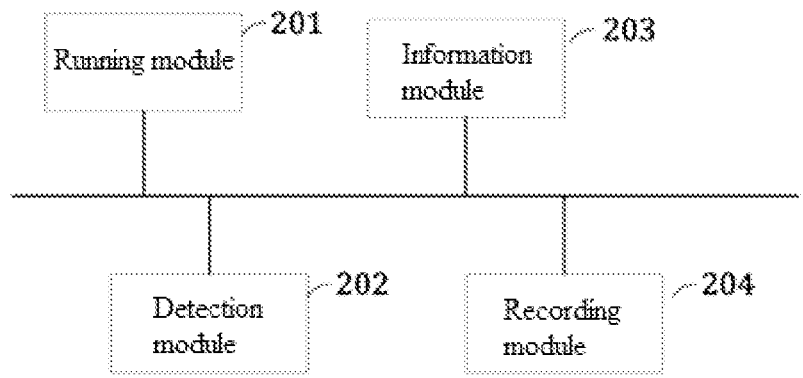
FIG. 3 is a schematic diagram of an embodiment of a server power-down detection system provided by the present disclosure.

Based on the above objective, a second aspect of the embodiments of the present disclosure provides a server power-down detection system. FIG. 3 is a schematic diagram of an embodiment of a server power-down detection system provided by the present disclosure. Taking a system shown in FIG. 3 as an example, the system includes: a running module 201 configured for, in response to the completion of hardware power on, controlling a PCH to read BIOS codes from BIOS flash storage particles via a first interface and running the BIOS codes; a detection module 202 configured for detecting whether bits of a register of the PCH have been set; an information module 203 configured for, in response to the setting of the bits of the register of the PCH, controlling the PCH to send power-down completion information to a BMC via a second interface; and a recording module 204 configured for, in response to the BMC receiving the power-down completion information, recording the power-down completion information in BMC flash storage particles, and performing the hardware power on again until a test is completed.

In some implementations, the system further includes: a second running module configured for, in response to the completion of hardware power on, reading BMC codes from the BMC flash storage particles and running the BMC codes.

In some implementations, the system further includes: a check module configured for, in response to a stop in a test process, checking whether the power-down completion information is present in the BMC.

In some implementations, the system further includes: an adjustment module configured for, in response to the absence of the power-down completion information in the BMC, prolonging an interval time for power down.

In some implementations, the recording module 204 is configured for: incrementing the number of tests by one, determining whether the number of tests reaches a first threshold value, and determining, based on the determination result, whether to return to or complete the test.

In some implementations, the running module 201 is configured for: controlling the PCH to read the BIOS codes from the BIOS flash storage particles via the first interface, and to transmit the BIOS codes to a CPU via a third interface for running.

In some implementations, the system further includes: an alarm module configured for giving an alarm in response to a duration in which the bits of the register of the PCH have not been set exceeding a second threshold value.

Based on the above objective, a third aspect of the embodiments of the present disclosure provides a computer device, including: at least one processor; and a memory storing computer instructions executable on the processor, where the instructions are executed by the processor to implement the following steps: S1, in response to the completion of hardware power on, a PCH is controlled to read BIOS codes from BIOS flash storage particles via a first interface and the BIOS codes are run; S2, whether bits of a register of the PCH have been set is detected; S3, in response to the setting of the bits of the register of the PCH, the PCH is controlled to send power-down completion information to a BMC via a second interface; and S4, in response to the BMC receiving the power-down completion information, the power-down completion information is recorded in BMC flash storage particles, and the hardware power on is performed again until a test is completed.

In some implementations, a step is further included: in response to the completion of hardware power on, BMC codes are read from the BMC flash storage particles and the BMC codes are run.

In some implementations, a step is further included: in response to a stop in a test process, whether the power-down completion information is present in the BMC is checked.

In some implementations, a step is further included: in response to the absence of the power-down completion information in the BMC, an interval time for power down is prolonged.

In some implementations, the step that the hardware power on is performed again until a test is completed includes: the number of tests is incremented by one, whether the number of tests reaches a first threshold value is determined, and whether to return to or complete the test is determined based on the determination result.

In some implementations, the step that a PCH is controlled to read BIOS codes from BIOS flash storage particles via a first interface and the BIOS codes are run includes: the PCH is controlled to read the BIOS codes from the BIOS flash storage particles via the first interface, and to transmit the BIOS codes to a CPU via a third interface for running.

In some implementations, a step is further included: an alarm is given in response to a duration in which the bits of the register of the PCH have not been set exceeding a second threshold value.

Figure 4:
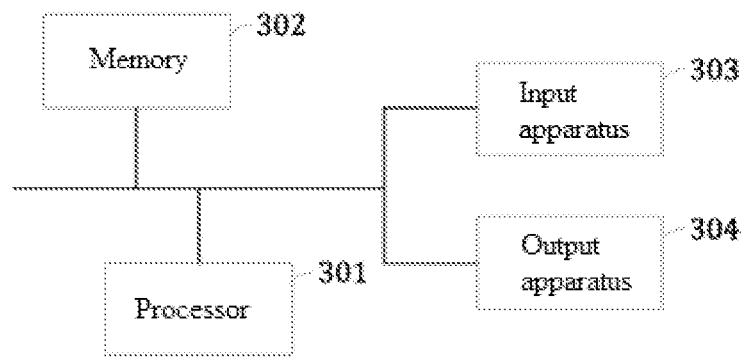
FIG. 4 is a schematic diagram of a hardware structure of an embodiment of a computer device for server power-down detection provided by the present disclosure.

FIG. 4 is a schematic diagram of a hardware structure of an embodiment of a computer device for server power-down detection provided by the present disclosure.

Taking a device shown in FIG. 4 as an example, the device includes a processor 301 and a memory 302, and may alternatively include an input apparatus 303 and an output apparatus 304.

The processor 301, the memory 302, the input apparatus 303, and the output apparatus 304 may be connected by a bus or other means. In FIG. 4, bus connection is used as an example.

The memory 302, as a non-volatile computer-readable storage medium, may be configured for storing non-volatile software programs, non-volatile computer-executable programs, and modules, such as program instructions/modules corresponding to the server power-down detection method in the embodiments of the present application. The processor 301 runs the non-volatile software programs, instructions, and modules stored in the memory 302 to execute various function applications of a server and data processing, that is, to implement the server power-down detection method in the foregoing method embodiments.

The memory 302 may include a program storage area and a data storage area. The program storage area may store an operating system, and an application required by at least one function. The data storage area may store data created according to the use of the server power-down detection method. In addition, the memory 302 may include an express random access memory, and may also include a non-volatile memory, such as at least one of a magnetic disk storage device, a flash memory, or other non-volatile solid-state storage devices. In some embodiments, the memory 302 may alternatively include memories remotely disposed relative to the processor 301, and these remote memories may be connected to a local module through a network. Examples of the network include, but are not limited to, the Internet, an intranet, a local area network, a mobile communications network, or a combination thereof.

The input apparatus 303 may receive input information such as a user name and a password. The output apparatus 304 may include a display device such as a display.

Program instructions/modules corresponding to one or more server power-down detection methods are stored in the memory 302, and when executed by the processor 301, the server power-down detection method in any of the foregoing method embodiments is performed.

Any embodiment of the computer device that executes the foregoing server power-down detection method can achieve the same or similar effects as the corresponding embodiment of any of the foregoing methods.

Figure 5:
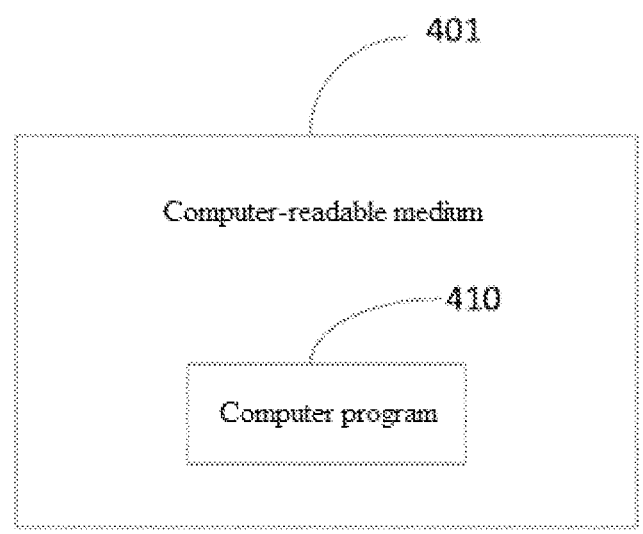
FIG. 5 is a schematic diagram of an embodiment of a computer-readable storage medium for server power-down detection provided by the present disclosure.

The present disclosure further provides a computer-readable storage medium. FIG. 5 is a schematic diagram of an embodiment of a computer-readable storage medium for server power-down detection provided by the present disclosure. As shown in FIG. 5, a computer-readable storage medium 401 stores a computer program 410 that performs the above method when executed by a processor.

Finally, it should be noted that those of ordinary skill in the art may understand that all or part of the flows for implementing the methods of the foregoing embodiments may be completed by a computer program instructing relevant hardware, the program of the server power-down detection method may be stored in a computer-readable storage medium, and when executed, the program may include the flow of the embodiment of each method above. The storage medium of the program may be a magnetic disk, an optical disk, a read-only memory (ROM), a random access memory (RAM), or the like. The foregoing embodiment of the computer program may achieve the same or similar effects as the corresponding embodiment of any of the foregoing methods.

Described above are exemplary embodiments of the present disclosure. However, it should be noted that various changes and modifications may be made without departing from the scope of the embodiments of the present disclosure as defined by the claims. The functions, steps and/or operations of the method claims according to the disclosed embodiments described herein do not need to be performed in any specific order. Moreover, although the elements disclosed in the embodiments of the present disclosure may be described or required in individual forms, they may also be understood as plural unless explicitly limited to a singular number.

It should be understood that, as used herein, the singular form "a" is intended to include a plural form as well unless the context clearly supports exceptions. It should also be understood that "and/or" as used herein means any and all possible combinations including one or more items associatively listed.

The foregoing serial numbers of the embodiments of the present disclosure are disclosed for description only and do not represent the advantages and disadvantages of the embodiments.

Those of ordinary skill in the art may understand that all or some of the steps of the foregoing embodiments may be completed by hardware, or may be completed by a program instructing relevant hardware. The program may be stored in a computer-readable storage medium. The storage medium mentioned above may be a read-only memory, a magnetic disk, an optical disk, or the like.

It should be understood by those of ordinary skill in the art that the discussion of any of the above embodiments is exemplary only and is not intended to imply that the scope of the embodiments of the present disclosure (including the claims) is limited to these examples. Under the idea of the embodiments of the present disclosure, the technical features in the above embodiments or different embodiments may be combined, and there are many other variations in different aspects of the embodiments of the present disclosure as above, which are not provided in detail for brevity. Therefore, any omissions, modifications, equivalent substitutions, improvements, and the like made within the spirit and principles of the embodiments of the present disclosure should be included within the scope of protection of the embodiments of the present disclosure.

What is claimed is:

1. A server power-down detection method, comprising following steps:
  in response to a completion of hardware power on, controlling a platform controller hub (PCH) to read BIOS (Basic Input Output System) codes from a BIOS flash memory via a first interface and running the BIOS codes;
  detecting whether bits of a register of the PCH have been set;

in response to the bits of the register of the PCH being set, controlling the PCH to send power-down completion information to a BMC (Baseboard Management Controller) via a second interface; and in response to the BMC receiving the power-down completion information, recording the power-down completion information in a BMC flash memory, and performing the hardware power on again until a test is completed.

2. The method according to claim 1, further comprising:
in response to the completion of the hardware power on, reading BMC codes from the BMC flash memory and running the BMC codes.

3. The method according to claim 1, further comprising:
in response to a stop in a test process, checking whether the power-down completion information is present in the BMC.

4. The method according to claim 3, further comprising:
in response to an absence of the power-down completion information in the BMC, prolonging an interval time for power down.

5. The method according to claim 1, wherein the step of performing the hardware power on again until the test is completed comprises:
incrementing a number of tests by one, determining whether the number of tests reaches a first threshold value, and determining, based on a determination result, whether to return to or complete the test.

6. The method according to claim 1, wherein the step of controlling the PCH to read the BIOS codes from the BIOS flash memory via the first interface and running the BIOS codes comprises:
controlling the PCH to read the BIOS codes from the BIOS flash memory via the first interface, and to transmit the BIOS codes to a CPU (Central Processing Unit) via a third interface for running.

7. The method according to claim 1, further comprising:
giving an alarm in response to a duration in which the bits of the register of the PCH have not been set exceeding a second threshold value.

8. A computer device, comprising:
at least one processor; and
a memory storing computer instructions executable on the at least one processor, wherein the at least one processor, upon execution of the computer instructions, is configured to:
in response to a completion of hardware power on, control a platform controller hub (PCH) to read BIOS (Basic Input Output System) codes from a BIOS flash memory via a first interface and running the BIOS codes;
detect whether bits of a register of the PCH have been set;
in response to the bits of the register of the PCH being set, control the PCH to send power-down completion information to a BMC (Baseboard Management Controller) via a second interface; and
in response to the BMC receiving the power-down completion information, record the power-down completion information in a BMC flash memory, and perform the hardware power on again until a test is completed.

9. The computer device according to claim 8, wherein the at least one processor, upon execution of the computer instructions, is further configured to:
in response to the completion of the hardware power on, read BMC codes from the BMC flash memory and run the BMC codes.

10. The computer device according to claim 8, wherein the at least one processor, upon execution of the computer instructions, is further configured to:
in response to a stop in a test process, check whether the power-down completion information is present in the BMC.

11. The computer device according to claim 10, wherein the at least one processor, upon execution of the computer instructions, is further configured to:
in response to an absence of the power-down completion information in the BMC, prolong an interval time for power down.

12. The computer device according to claim 8, wherein the at least one processor, upon execution of the computer instructions, is further configured to:
increment a number of tests by one, determine whether the number of tests reaches a first threshold value, and determine, based on a determination result, whether to return to or complete the test.

13. The computer device according to claim 8, wherein the at least one processor, upon execution of the computer instructions, is further configured to:
control the PCH to read the BIOS codes from the BIOS flash memory via the first interface, and to transmit the BIOS codes to a CPU (Central Processing Unit) via a third interface for running.

14. The computer device according to claim 8, wherein the at least one processor, upon execution of the computer instructions, is further configured to:
give an alarm in response to a duration in which the bits of the register of the PCH have not been set exceeding a second threshold value.

15. A non-transitory computer-readable storage medium storing a computer program, wherein the computer program, upon execution by a processor, is configured to cause the processor to:
in response to a completion of hardware power on, control a platform controller hub (PCH) to read BIOS (Basic Input Output System) codes from a BIOS flash memory via a first interface and running the BIOS codes;
detect whether bits of a register of the PCH have been set;
in response to the bits of the register of the PCH being set, control the PCH to send power-down completion information to a BMC (Baseboard Management Controller) via a second interface; and
in response to the BMC receiving the power-down completion information, record the power-down completion information in a BMC flash memory, and perform the hardware power on again until a test is completed.

16. The non-transitory computer-readable storage medium according to claim 15, wherein the computer program, upon execution by the processor, is further configured to cause the processor to:
in response to the completion of the hardware power on, read BMC codes from the BMC flash memory and run the BMC codes.

17. The non-transitory computer-readable storage medium according to claim 15, wherein the computer program, upon execution by the processor, is further configured to cause the processor to:
in response to a stop in a test process, check whether the power-down completion information is present in the BMC.

18. The non-transitory computer-readable storage medium according to claim 17, wherein the computer program, upon execution by the processor, is further configured to cause the processor to:
   in response to an absence of the power-down completion information in the BMC, prolong an interval time for power down.

19. The non-transitory computer-readable storage medium according to claim 15, wherein the computer program, upon execution by the processor, is further configured to cause the processor to:
   increment a number of tests by one, determine whether the number of tests reaches a first threshold value, and determine, based on a determination result, whether to return to or complete the test.

20. The non-transitory computer-readable storage medium according to claim 15, wherein the computer program, upon execution by the processor, is further configured to cause the processor to:
   control the PCH to read the BIOS codes from the BIOS flash memory via the first interface, and to transmit the BIOS codes to a CPU (Central Processing Unit) via a third interface for running.

* * * * *